United States Patent
Yamada et al.

(10) Patent No.: US 10,224,748 B2
(45) Date of Patent: Mar. 5, 2019

(54) POWER TRANSMITTING DEVICE, POWER RECEIVING DEVICE, AND WIRELESS POWER TRANSMITTING SYSTEM

(71) Applicant: KABUSHIKI KAISHA TOSHIBA, Tokyo (JP)

(72) Inventors: Akiko Yamada, Yokohama (JP); Tetsu Shijo, Tokyo (JP); Shuichi Obayashi, Yokohama (JP); Hiroaki Ishihara, Kawasaki (JP); Kohei Onizuka, Tokyo (JP); Kenichirou Ogawa, Kawasaki (JP); Fumi Moritsuka, Kawasaki (JP); Hiroki Kudo, Kawasaki (JP); Noriaki Oodachi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1201 days.

(21) Appl. No.: 14/314,584

(22) Filed: Jun. 25, 2014

(65) Prior Publication Data
US 2015/0001955 A1   Jan. 1, 2015

(30) Foreign Application Priority Data

Jun. 27, 2013   (JP) .................................. 2013-135017

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/12* | (2016.01) | |
| *H02J 5/00* | (2016.01) | |
| *H02J 7/02* | (2016.01) | |

(Continued)

(52) U.S. Cl.
CPC .............. *H02J 50/12* (2016.02); *H02J 5/005* (2013.01); *H02J 7/025* (2013.01); *H02J 17/00* (2013.01); *H02J 50/80* (2016.02)

(58) Field of Classification Search
CPC .................................. H02J 17/00; H02J 5/005
USPC ......................................................... 307/104
See application file for complete search history.

(56) References Cited

U.S. PATENT DOCUMENTS 8,253,278 B2 *   8/2012   Cook ....................... H01Q 7/08
                                                                    307/104
8,855,554 B2   10/2014   Cook et al.
(Continued)

FOREIGN PATENT DOCUMENTS

| JP | 2007125926 A | 5/2007 |
|---|---|---|
| JP | 2010-172084 | 8/2010 |

(Continued)

*Primary Examiner* — Rexford Barnie
*Assistant Examiner* — Toan Vu
(74) *Attorney, Agent, or Firm* — Finnegan, Henderson, Farabow, Garrett & Dunner, L.L.P.

(57) ABSTRACT

According to one embodiment, there is provided a power transmitting device including: a power supply, a resonator, an adjuster and a controller. The power supply supplies AC power. The resonator includes a magnetic core and a coil wound around the magnetic core, the resonator wirelessly transmitting the AC power supplied from the power supply to a different resonator arranged to be opposed to the resonator. The adjuster relatively moves the coil and the magnetic core along a longitudinal direction of the coil. The controller controls the adjuster based on a value of current flowing in the resonator to adjust relative positions of the magnetic core and the coil.

4 Claims, 9 Drawing Sheets

(51) Int. Cl.
*H02J 50/80* (2016.01)
*H02J 17/00* (2006.01)

(56) References Cited

U.S. PATENT DOCUMENTS

| | | |
|---|---|---|
| 2003/0052785 A1 | 3/2003 | Gisselberg et al. |
| 2009/0243397 A1* | 10/2009 | Cook ............... H02J 5/005 307/104 |
| 2010/0315038 A1* | 12/2010 | Terao ............... H01F 38/14 320/108 |
| 2012/0229140 A1* | 9/2012 | Shimokawa ........... H02J 5/005 324/318 |
| 2013/0135077 A1 | 5/2013 | Shijo et al. |
| 2013/0313893 A1 | 11/2013 | Ichikawa |

FOREIGN PATENT DOCUMENTS

| | | |
|---|---|---|
| JP | 2010213234 A | 9/2010 |
| JP | 2011514781 A | 5/2011 |
| JP | 201299644 A | 5/2012 |
| JP | 2012147560 A | 8/2012 |
| JP | 201369169 A | 4/2013 |
| JP | 2013106477 A | 5/2013 |
| WO | 2012111085 A | 8/2012 |

\* cited by examiner (A)

(B)

POWER TRANSMITTING DEVICE, POWER RECEIVING DEVICE, AND WIRELESS POWER TRANSMITTING SYSTEM

CROSS-REFERENCE TO RELATED APPLICATIONS

This application is based upon and claims the benefit of priority from Japanese Patent Application No. 2013-135017, filed Jun. 27, 2013; the entire contents of which are incorporated herein by reference.

FIELD

Embodiments described herein relate to a power transmitting device, a power receiving device, and a wireless power transmitting system.

BACKGROUND

A wireless power transmitting system for wirelessly transmitting power between coils based on a coupling coefficient or a mutual inductance of the coils are known. A greater product of a coupling coefficient k between the coils and Q factors of the coils leads to a higher maximum value of transmission efficiency between the coils.

To raise the coupling coefficient k, a resonator structure in which a coil is wound around a magnetic core is proposed. With such a structure, it is possible to provide the wireless power transmission in which reduction of the coupling coefficient is small with respect to a positional displacement between the transmitting and receiving resonators in a direction parallel to that of the winding of the coil, and which is robust against efficiency variations.

In a wireless power transmission in a resonance method, transmission efficiency becomes maximum when the resonance frequencies of both transmitting and receiving resonators are equal. However, the resonance frequency of a resonator for wirelessly transmitting power varies under a variety of conditions such as shape, ambient environment, and long-term deterioration, which may cause a problem of the resonance frequency deviation from a desired value.

For example, in the above resonator structure, when the distance between a power transmitting coil and a power receiving coil is short, an inductance value is increased under the influence of a magnetic core on the counterpart side. The inductance value also varies depending on the positional relation between the transmitting and receiving resonators. These things cause a problem of the resonance frequency deviation from the desired value, leading to deterioration of the transmission efficiency.

DETAILED DESCRIPTION

According to one embodiment, there is provided a power transmitting device including: a power supply, a resonator, an adjuster and a controller.

The power supply supplies AC (Alternating Current) power.

The resonator includes a magnetic core and a coil wound around the magnetic core, the resonator wirelessly transmitting the AC power supplied from the power supply to a different resonator arranged to be opposed to the resonator.

The adjuster relatively moves the coil and the magnetic core along a longitudinal direction of the coil.

The controller controls the adjuster based on a value of current flowing in the resonator to adjust relative positions of the magnetic core and the coil.

Hereinafter, embodiments will be described with reference to the drawings.

First Embodiment

Figure 1:
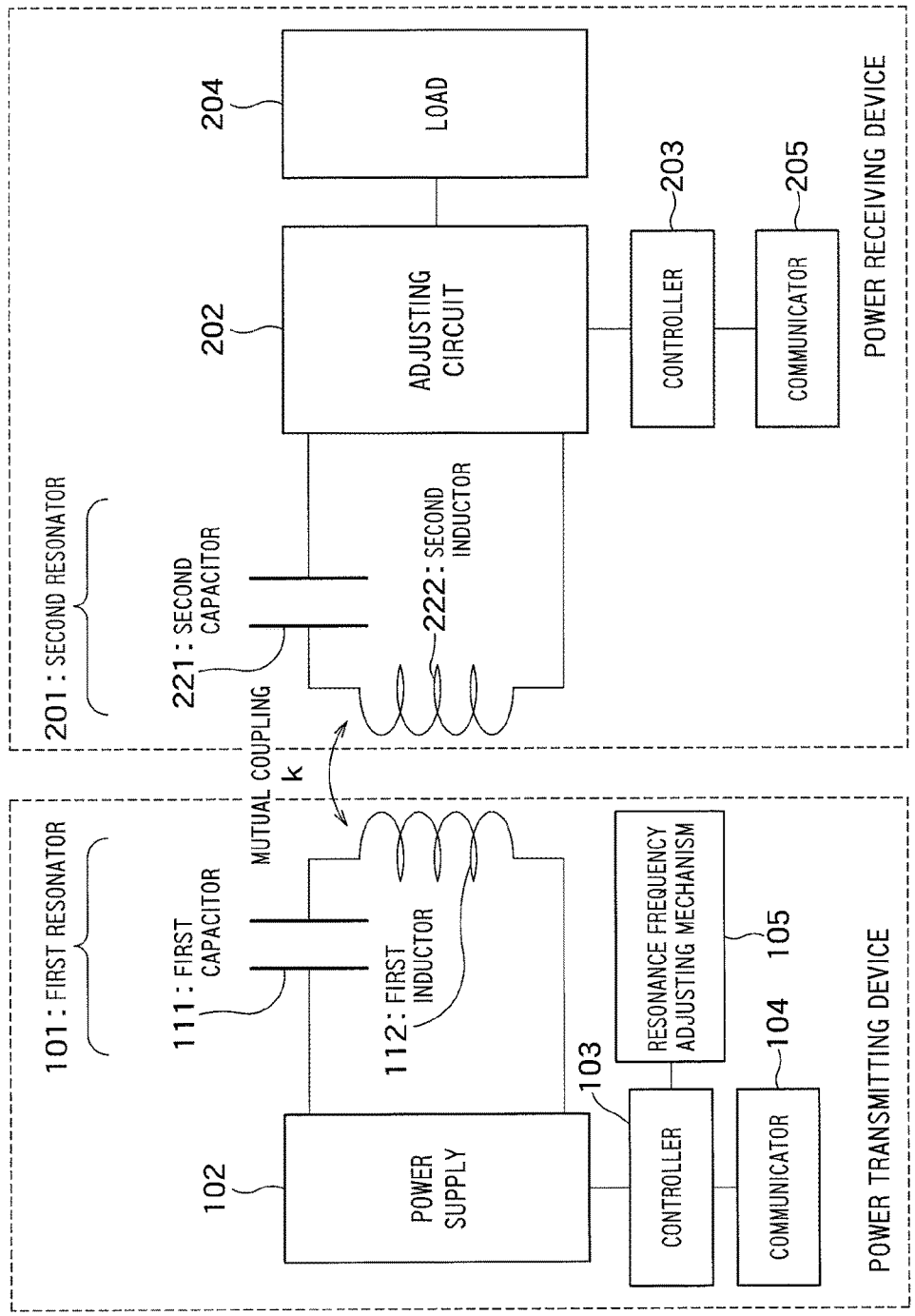
FIG. 1 shows a wireless power transmitting system according to a first embodiment including a power transmitting device and a power receiving device for performing wireless power transmission together with the power transmitting device.

FIG. 1 shows a wireless power transmitting system according to a first embodiment including a power transmitting device and a power receiving device for performing wireless power transmission together with the power transmitting device.

The power transmitting device shown in FIG. 1 includes a first resonator 101, a power supply 102, a first controller 103, a first communicator 104, and a first resonance frequency adjusting mechanism (adjuster) 105.

The power receiving device shown in FIG. 1 includes a second resonator 201, an adjusting circuit 202, a second controller 203, a load 204, and a second communicator 205.

The first resonator 101 of the power transmitting device includes a first inductor 112, and a first capacitor 111 connected in series to the first inductor 112. The first inductor 112 has an inductance $L_1$, and the first capacitor 111 has a capacitance $C_1$, for example.

The first inductor 112 includes a magnetic core and a coil formed by a winding wound around the magnetic core. The number of coils may be one, or a plurality of coils may be spaced apart on the magnetic core.

Although the first capacitor 111 is connected in series to the first inductor 112, the first capacitor 111 may be connected in parallel thereto. Alternatively, a plurality of capacitors may be used, a part of which are connected in series to the first inductor 112, and the others are connected in parallel to the first inductor 112. Furthermore, the number of parallel connections may be one or more.

Note that, in general, the capacitance of a resonator can be complemented by a parasitic capacitance of a coil or the like. In such a case, a capacitor as a circuit component can be omitted from among constituents of the resonator. For example, if the resonator includes an inductor equivalent to a self-resonant coil, a capacitor as a circuit component may be dispensed with.

A second resonator 201 of the power receiving device includes a second inductor 222 and a second capacitor 221 connected in series to the second inductor 222. The second inductor 222 has an inductance $L_2$, and the second capacitor 221 has a capacitance $C_2$, for example.

The second inductor 222 includes a magnetic core and a coil formed by a winding wound around the magnetic core. The number of coils may be one, or a plurality of coils may be spaced apart on the magnetic core.

Although the second capacitor 221 is connected in series to the second inductor 222, the second capacitor 221 may be connected in parallel thereto. Alternatively, a plurality of capacitors may be used, a part of which are connected in series to the second inductor 222, and the others are connected in parallel to the second inductor 222. Furthermore, the number of parallel connections may be one or more.

The first communicator 104 of the power transmitting device communicates with the second communicator 205 of the power receiving device to receive information such as a voltage and a current on a power-receiving-device side, and information indicating an electric energy required by the power-receiving side, from the power receiving device. With these pieces of the information, it is possible to determine parameters for the wireless power transmission, and to grasp a state of the power receiving device at the time of power transmission. In addition, a variety of pieces of control information can be exchanged. Although here is described a configuration for wireless communications as the communications between the first communicator 104 and the second communicator 205, a configuration for wired communications can be employed.

The resonance frequency adjusting mechanism 105 of the power transmitting device relatively moves the coil and the magnetic core in the first inductor 112 in a direction of the length of the coil, that is, in a direction perpendicular to the winding direction of the coil, under the control of the first controller 103. Methods of moving includes moving only the coil, moving only the magnetic body, and moving both of them. The methods of moving the coil or the magnetic core may include a method making use of mechanical or electrical force, and the other methods.

The first controller 103 of the power transmitting device monitors a current flowing in the first resonator 101 and controls the resonance frequency adjusting mechanism 105 based on a value of the current to adjust relative positions of the magnetic core and the coil. A method of controlling will be hereafter described.

The power supply 102 supplies AC (Alternating Current) power to the first resonator 101. The power supply 102 may supply the AC power directly to the first resonator 101 through wiring or may supply the AC power wirelessly. Examples of the wireless supply include a configuration in which a loop element is connected to the power supply 102, another loop element is connected to the first capacitor 111, and AC power is supplied between the loop elements in a noncontact manner. The frequency of the AC power supplied by the power supply 102 may be controllable by the first controller 103, or may be fixed.

The second resonator 201 of the power receiving device receives power from the first resonator 101 of the power transmitting device in a noncontact manner. The power received from the power transmitting device is transmitted to the adjusting circuit 202.

The adjusting circuit 202 includes a rectifier or a stepping up/down circuit, or both of them. The adjusting circuit 202 rectifies the AC power input from the second resonator 201 with the rectifier, and further converts the power into a DC power of a desired voltage by stepping up or down the voltage (hereinafter, referred to as stepping up/down) with the stepping up/down circuit. The converted DC power is supplied to the load 204.

The second resonator 201 of the power receiving device may supply the AC power directly to the adjusting circuit (the stepping up/down circuit and the rectifier) 202 and the load 204 through wiring, or may supply the AC power wirelessly by the abovementioned method that uses the loop elements.

In the case where the adjusting circuit 202 includes both of the rectifier and the stepping up/down circuit, the AC power input from the second resonator 201 of the power receiving device may be input into the rectifier after being stepped up/down with the stepping up/down circuit, or may be stepped up/down with the stepping up/down circuit (e.g., a DC/DC converter) after being converted with the rectifier.

The load 204 is connected to the outputting terminal of the rectifier or the stepping up/down circuit to receive the DC power. The load 204 is a circuit such as a load circuit that immediately consumes the power, or a device such as a battery that accumulates the power.

Hereafter, there will be described a method in which the first controller 103 controls the resonance frequency adjusting mechanism 105 to adjust the relative positions of the magnetic core and the coil. In general, since an impedance of a series resonance circuit is lowest at a resonance frequency, a current flowing in the series resonance circuit is highest at the resonance frequency. Thus, an AC power at a predetermined transmission frequency (operational frequency) is supplied from the power supply, and the relative positions of the magnetic core and the coil are adjusted while a current value at an inputting terminal of the first resonator 101 is monitored. The adjustment of the relative positions of the magnetic core and the coil causes the self-inductance value of the coil to vary, and also causes the resonance frequency to vary (the details thereof will be described hereafter). When the value of the current flowing in the first resonator 101 is highest, the resonance frequency of the first resonator 101 is identical or substantially identical to the above transmission frequency. The magnetic core and the coil are positioned in the relative positions at this point. Although, in this case, the magnetic core and the coil are positioned in the positions at which the current value is highest, they may be positioned in the positions at which the current value becomes equal to or higher than a threshold value. Note that, when the relative position adjustment is performed, the first resonator 101 of the power transmitting device and the second resonator 201 of the power receiving device are in the state where they are opposed to each other to enable the power transmission.

Hereinafter, there will be described a specified example in which the relative positions of the magnetic core and the coil are adjusted to adjust the resonance frequency of the resonator.

Figure 2:
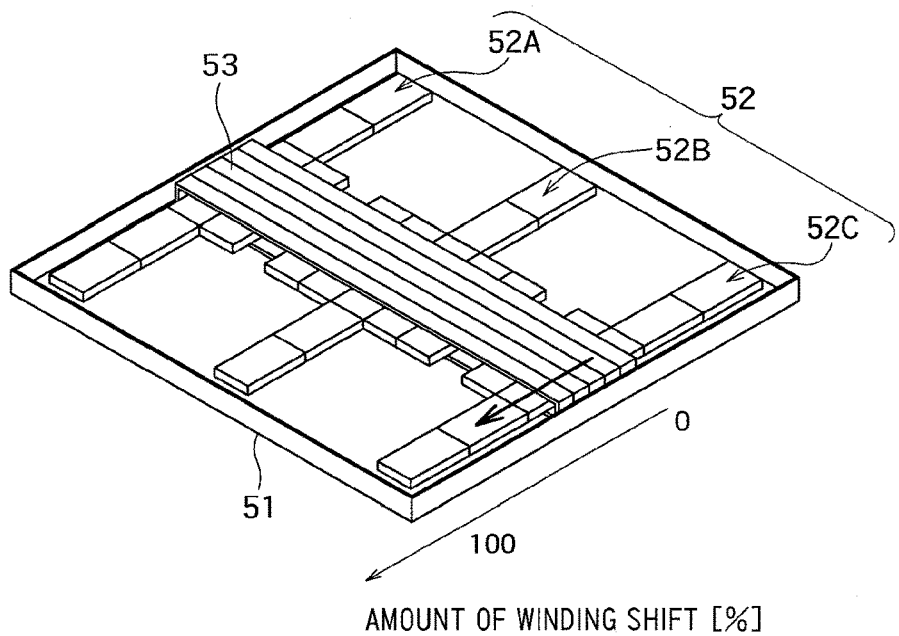
FIG. 2 shows a configuration example of a resonator installed in the power transmitting device shown in FIG. 1.

FIG. 2 shows a configuration example of the first inductor 112 of the power transmitting device, in a perspective view. A magnetic core 52 is arranged on a conductive plate 51 such as an aluminum plate. The magnetic core 52 includes three core blocks 52A, 52B, and 52C spaced apart from each other. The width of each core block is expanded at a center portion thereof, and is narrowed toward the ends thereof. The magnetic core 52 has a coil 53 wound therearound. The coil 53 is wound around the center portion of the magnetic core 52, that is, around an expanded portion thereof. The cross section of each core block changes depending on a length of the width, along a longitudinal direction of the coil 53.

In the shown example, each of the core blocks 52A, 52B, and 52C is formed by laying a plurality of rectangular unit blocks. This is one example, and the other configuration may be employed. For example, the magnetic core or the core block may be configured by a single magnetic plate, or may be configured by stacking magnetic sheets.

The coil 53 can be moved by the resonance frequency adjusting mechanism 105 in the longitudinal direction of the coil 53, that is, in a direction of an arrow shown in FIG. 2. This allows for changing the relative positions of the magnetic core 52 and the coil 53. The coil 53 may also be able to be moved in both of a direction of the arrow shown in FIG. 2 and a direction opposite thereto. In an initial state, the coil 53 is arranged, for example, at the center portion of the magnetic core 52 in the longitudinal direction of the coil 53 (the direction of the arrow in FIG. 2).

Figure 3:
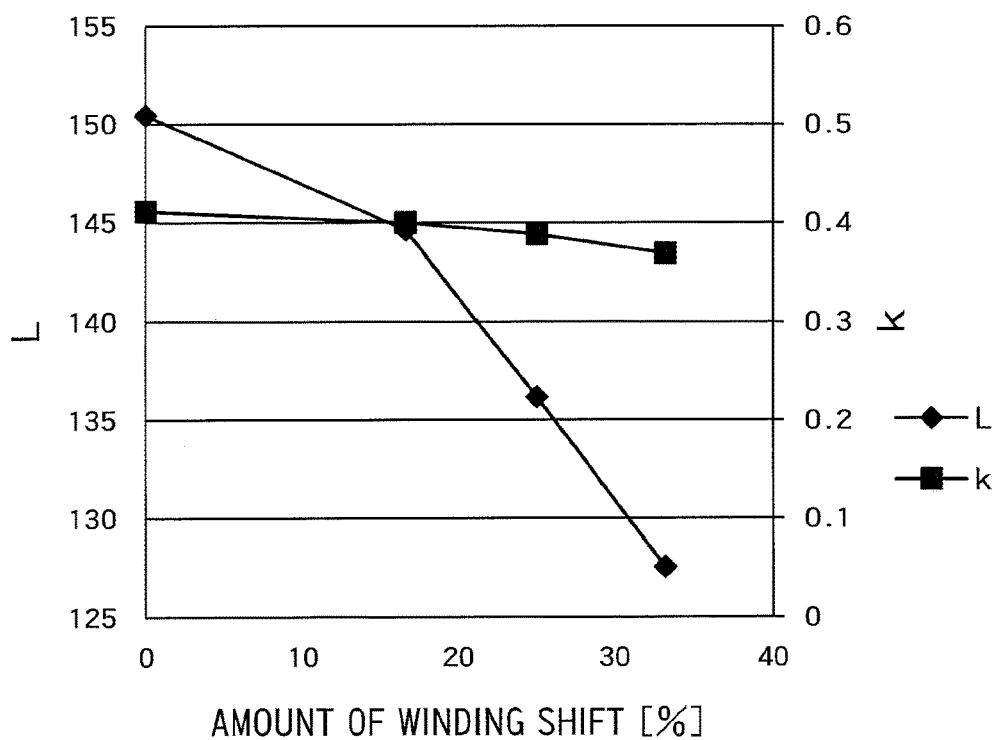
FIG. 3 graphically shows changes in a self-inductance value and a coupling coefficient with the change in the position of a coil.

FIG. 3 graphically shows the changes in a self-inductance value and a coupling coefficient of the resonator shown in FIG. 2 with the change in the position of the coil 53 of the resonator, which are calculated through an electromagnetic field simulation. Note that, the electromagnetic field simulation is performed in the state where a different resonator having the same configuration is arranged on the power-receiving side and is brought into a state where the different resonator is opposed to the resonator on the power-transmitting side.

The left-side vertical axis represents a self-inductance value L, the horizontal axis represents the amount of winding shift, and the right-side vertical axis represents a coupling coefficient k. Zero percent of the amount of winding shift corresponds to the center position of the magnetic core. Moving the coil in the direction of the arrow shown in FIG. 2 increases the amount of winding shift. When the amount of winding shift is slightly increased, the reduction in the coupling coefficient k is small, whereas the self-inductance value L significantly changes.

Here, the resonance frequency of the resonator can be calculated with the formula (1). Since the self-inductance value "L" can be changed by adjusting the relative positions of the coil and the magnetic core, the resonance frequency of the resonator can be adjusted by adjusting the relative positions of the coil and the magnetic core.

$$f = \frac{1}{2\pi\sqrt{LC}} \quad (1)$$

Here, as shown in FIG. 2, the magnetic core has a width that is largest at the center portion, and is narrowed toward the ends thereof. Thus, by moving the coil from the center portion of the magnetic core in an end direction, the width at a portion of the magnetic body surrounded by the coil significantly changes. Variations in the inductance value with the change in the position of the coil can therefore be made large. As a result, sensitivity of the change in the inductance value can be made high thereby making the change in the inductance large even if the range of movement of the coil is small, by making the change in the width of the magnetic body large within the range. In such a manner, the inductance value can be adjusted without changing the coupling state between the transmitting and receiving resonators on the whole.

Although here is described an example in which the coil 53 is moved, the position of the magnetic core 52 may be movable with the position of the coil 53 fixed. In this case, the coupling state thereof can be significantly improved especially when the transmitting and receiving resonators are at the positions at which they are in weak coupling (they are at null points). The movement of the magnetic core 52 is performed by moving the whole core, or moving one or more of the core blocks 52A, 52B, and 52C. In the latter case, the moving directions or the amounts of the movements can be made different for each core block.

Here, the shape of a magnetic core having an expanded width at the center portion thereof is not limited to the shape shown in FIG. 2. Examples of resonators using magnetic cores of the other shapes are shown in plan views of FIG. 4(A) to FIG. 4(H) and FIG. 5. In addition, as another example, FIG. 5A shows an example of a resonator using a magnetic core having a constant width, and a cross section that is largest at the center portion, and is narrowed towards the ends thereof. When the cross section is largest at the center portion and is narrowed towards the ends, even if the width is constant, the effect thereof to be obtained is the same as that of a magnetic core having an expanded width at the center portion.

As shown in FIG. 4(A) to FIG. 4(H), in any of the resonators, the width of the magnetic core is largest at the center portion thereof in the longitudinal direction of the coil, and the width is narrowed away from the center towards end directions. The drawings each show the state where the coil is wound around the center portion. As a result, by moving the coil from this state in the end direction, variations of the inductance value can be made large when the position of the coil is changed.

Figure 4:
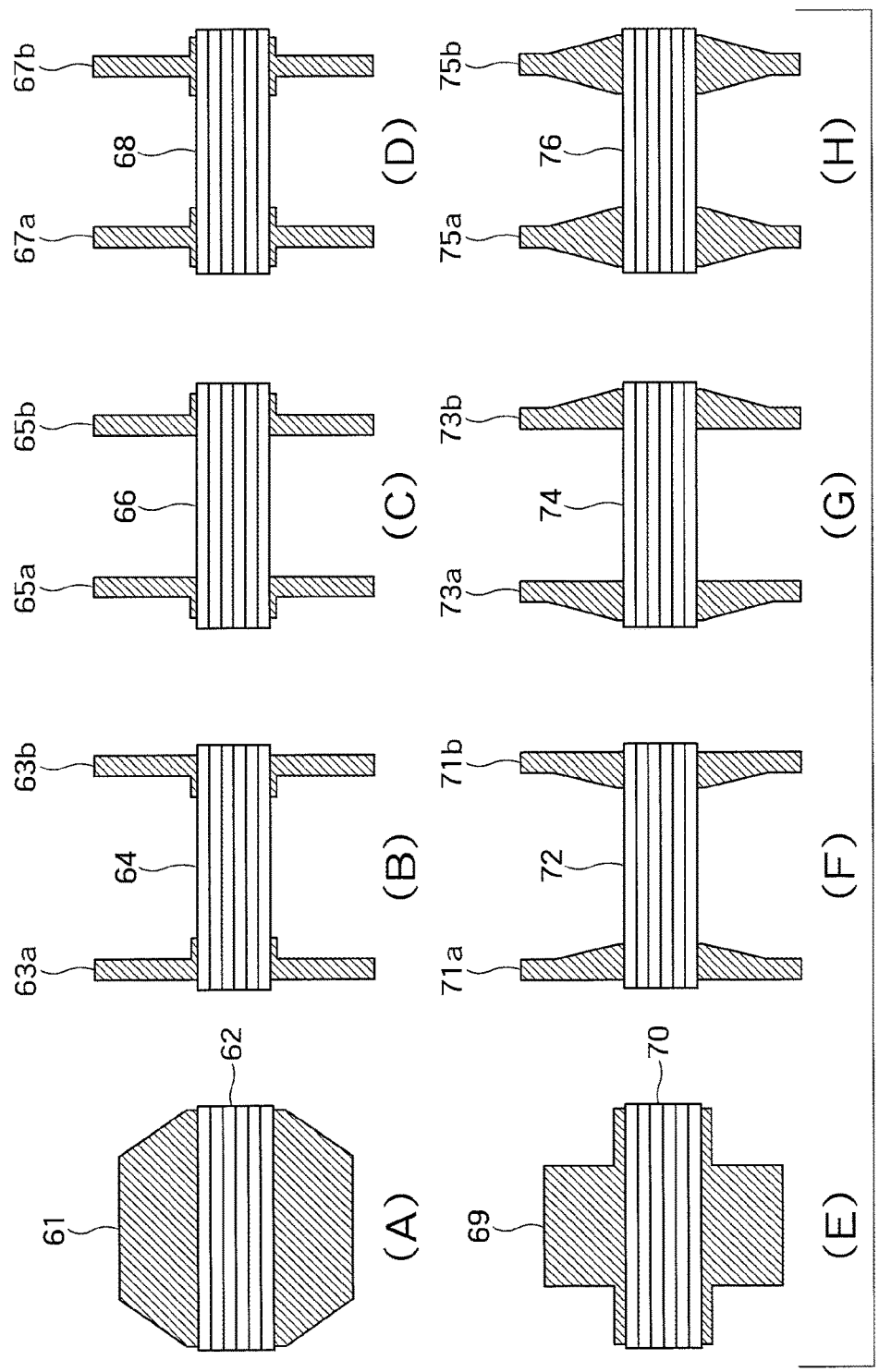
FIG. 4 shows examples of resonators using magnetic cores having shapes different from that of FIG. 2.
Figure 5:
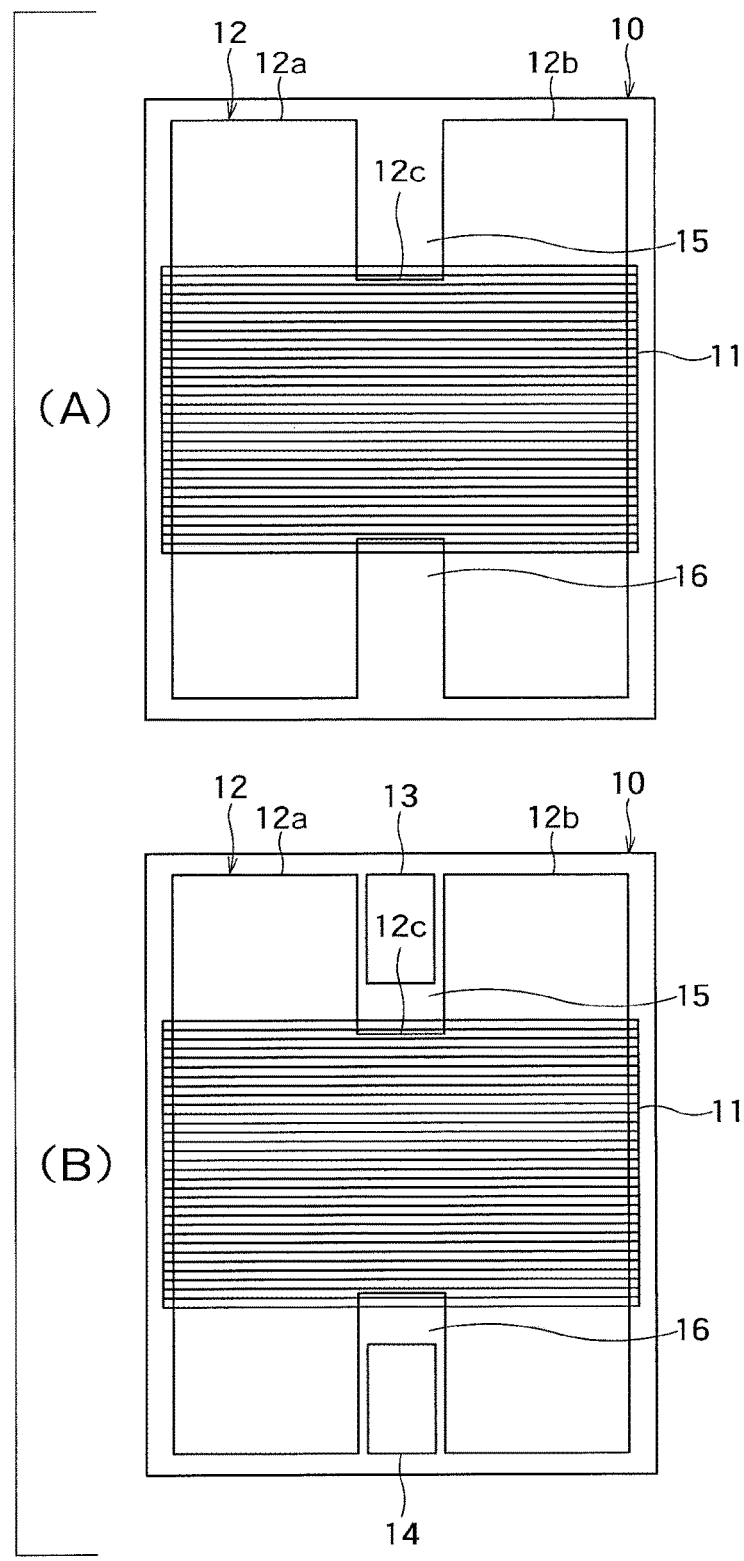
FIG. 5 shows examples of resonators using magnetic cores having shapes different from that of FIG. 2.
Figure 5A:
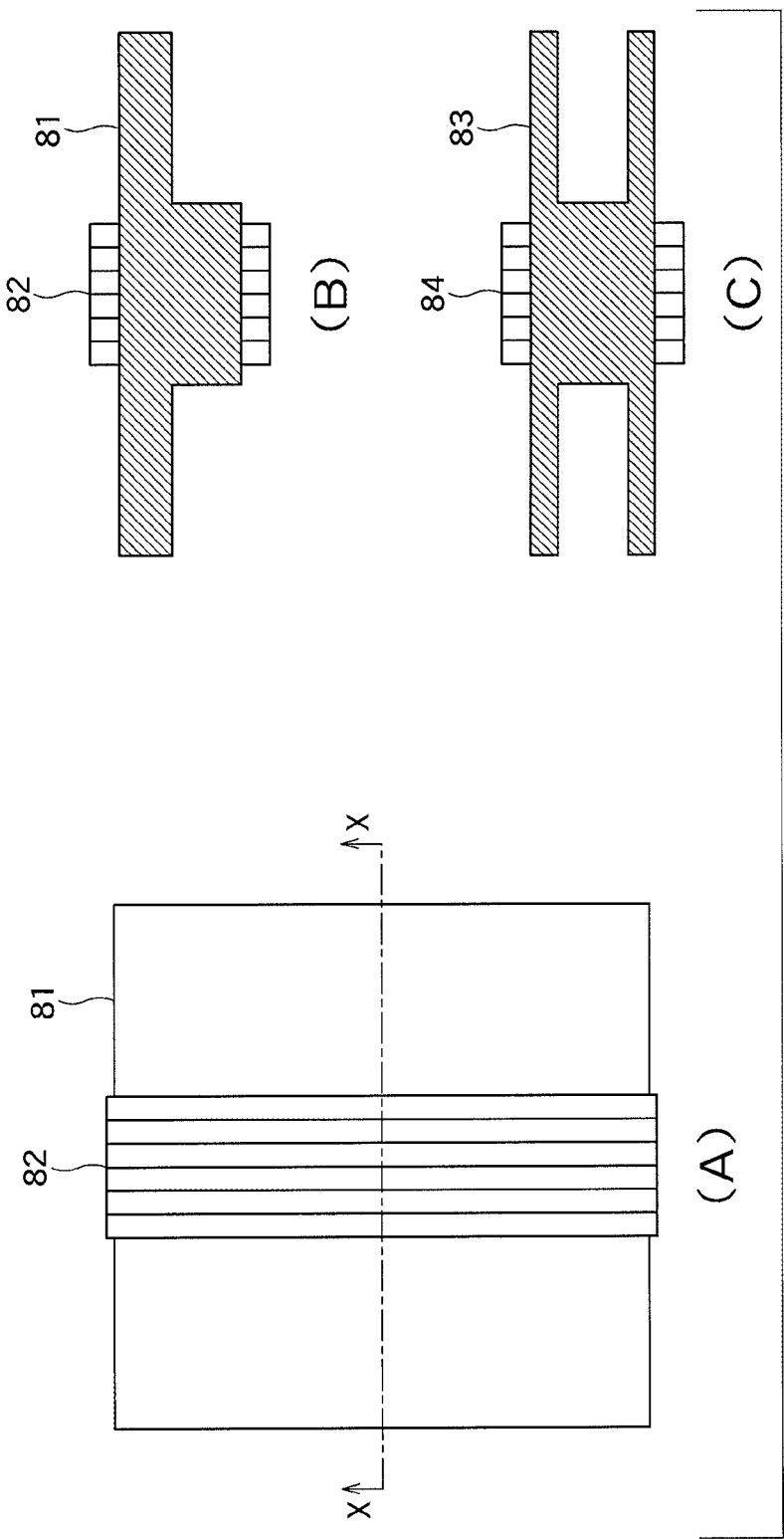
FIG. 5A shows examples of resonators using magnetic cores having shapes different from that of FIG. 2.

In FIG. 4(A), an octagonal magnetic core 61 has a coil 62 wound therearound. The coil 62 is wound so as to surround a core portion between left and right sides that are opposed to each other.

In FIG. 4(B), the widths at the center portions of left and right magnetic blocks 63a and 63b are expanded inward (in a direction in which the blocks are opposed to each other), and a coil 64 is wound so as to surround these portions.

In FIG. 4(C), the widths at the center portions of left and right magnetic blocks 65a and 65b are expanded outward, and a coil 66 is wound so as to surround these portions.

In FIG. 4(D), the widths at center portions of left and right magnetic blocks 67a and 67b are expanded inward and outward, and a coil 68 is wound so as to surround these portions.

In FIG. 4(E), a coil 70 is wound around a wide portion of a cross-shaped magnetic plate 69.

In FIG. 4(F), the widths of left and right magnetic blocks 71a and 71b are gradually expanded inward toward the centers thereof and the widths each have a constant amount near the centers. A coil 72 is wound so as to surround the portions of the constant width.

In FIG. 4(G), the widths of left and right magnetic blocks 73a and 73b are gradually expanded outward toward the centers thereof, and the widths each have a constant amount near the centers. A coil 74 is wound so as to surround the portions of the constant width.

In FIG. 4(H), the widths of left and right magnetic blocks 75a and 75b are gradually expanded inward and outward toward the centers thereof, and the widths each have a constant amount near the centers. A coil 76 is wound so as to surround the portions of the constant width.

In FIG. 5(A), a magnetic core 12 includes magnetic blocks 12*a*, 12*b*, and 12*c*, and has an H shape as a whole. The magnetic blocks 12*a* and 12*b* are spaced apart from each other. The magnetic core block 12*c* is arranged so as to bridge between the center portions of the magnetic blocks 12*a* and 12*b*. The length of the magnetic core block 12*c* is shorter than those of the magnetic blocks 12*a* and 12*b*, and gaps 15 and 16 are formed between both ends of the magnetic blocks 12*a* and 12*b*, respectively. A coil 11 is wound so as to surround the center portions of the magnetic core block 12*c* and the magnetic blocks 12*a* and 12*b*. Note that the magnetic core 12 and the coil 11 are arranged on a conductive plate 10.

FIG. 5(B) shows a configuration including capacitors 13 and 14 arranged in the gaps 15 and 16 of the magnetic core 12 shown in FIG. 5(A). Note that the capacitors 13 and 14 may be arranged being separated in a direction perpendicular to the plane of paper and facing notch portions 15 and 16. The capacitors 13 and 14 correspond to, for example, the capacitor 111 shown in FIG. 1. Although the number of capacitors is one in FIG. 1, here is shown an example in which the number is two. By arranging the capacitors 13 and 14 in the gaps 15 and 16, the capacitors can be incorporated in the power transmitting device while restricting the influence of the capacitors on an electrical characteristic of the coil 11 (e.g., a coupling characteristic to the coil of the facing power receiving device), and reducing the whole size. That is, the capacitors 13 and 14 can be installed on the conductive plate 10 on which the resonator (the magnetic core 12 and the coil 11) is also installed.

FIG. 5A(A) and FIG. 5A(B) show an example of a resonator using a magnetic core having a cross section that is largest at the center portion thereof and the cross section is narrowed towards the ends thereof. FIG. 5A(A) is a plan view, and FIG. 5A(B) is a cross sectional view taken along a line X-X of FIG. 5A(A). As shown in FIG. 5A(A), a coil 82 is wound around the center portion of the magnetic core that is rectangular in the plan view. The width of the magnetic core 81 is constant along a longitudinal direction of the coil 82. As shown in FIG. 5A(B), the cross section is largest at the center portion of the magnetic core 81 around which the coil 82 is wound, and the cross sections are made small at portions between the center portion and left and right ends of the magnetic core 81. By moving the coil 82 from this state in a left or right direction, variations in an inductance value can be made large when the position of the coil 82 is changed. FIG. 5A(C) shows another example of the resonator having a cross section that is largest at the center portion thereof. The illustration of the plan view of the resonator is omitted because it is the same as that of FIG. 5A(A). A coil 84 is wound around the center portion of a magnetic core 83. Hollows are formed between the center portion and left and right ends of the magnetic core 83, which make the cross sections of core portions small between the center portion and left and right ends. Therefore, by moving the coil 84 from the center portion in a left or right direction, the variations in an inductance value can be made large when the position of the coil 84 is changed.

Although, in any of the magnetic cores that have been described, a width and a cross section are expanded at the center portion thereof, the present embodiment is not limited thereto. For example, when a magnetic core having a constant width and a constant cross section is used, an inductance can be changed by adjusting the relative positions of the coil and the magnetic core.

Figure 6:
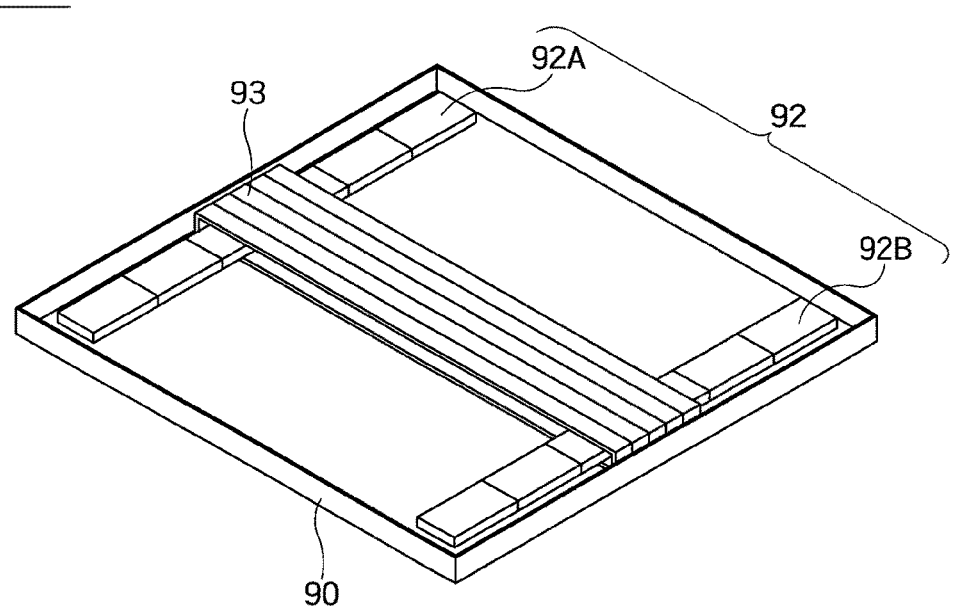
FIG. 6(A) shows an example of a resonator including a magnetic core having a constant width.
FIG. 6(B) shows a relation between the amount of winding shift and the amount of inductance value change, with respect to the resonator of FIG. 6(A) and the resonator of FIG. 2.
Figure 6:
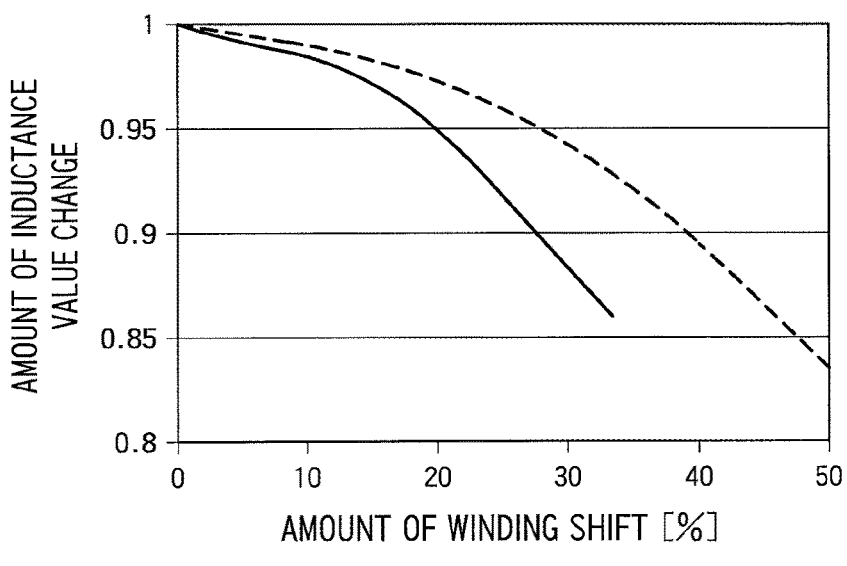

FIG. 6(A) shows an example of a resonator using a magnetic core in which the width and the cross section are constant along a longitudinal direction of a coil.

The resonator shown in FIG. 6(A) includes a magnetic core 92 and a coil 93. The magnetic core 92 includes core blocks 92A and 92B spaced apart from each other. The widths and the cross sections of the core blocks 92A and 92B are constant. Note that, as shown in FIG. 2, an additional core block having a constant width and a constant cross section may be arranged between the core blocks 92A and 92B. Alternatively, a single plate-like magnetic core may be used as a magnetic core having a constant width and a constant cross section.

To compare the relations between the amount of winding shift and the amount of inductance value change with respect to the resonator shown in FIG. 6(A) and the resonator shown in FIG. 2, the graphs thereof are shown in FIG. 6(B).

The horizontal axis represents the amount of winding shift, and zero percent of the amount of winding shift corresponds to the center of each magnetic core. The vertical axis represents the amount of inductance value change.

The amount of inductance value change is defined as (an inductance value when a winding is shifted)/(an inductance value when the amount of winding shift is zero).

The graph of a shape 1 corresponds to that of the resonator of FIG. 6(A), and the graph of a shape 2 corresponds to that of the resonator of FIG. 2.

As can be seen from FIG. 6(B), it is understood that even if a magnetic core having a constant width is used, an inductance changes with the shift of the position of the coil from the center of the magnetic core. There is an advantage of obtaining large changes in an inductance with the small amount of movement in the case of using the magnetic core having a width that changes along a moving direction of the coil as shown in FIG. 2. In such a case where weight reduction has priority, it is considered to use the configuration of FIG. 6(A).

Although, in any of the resonators that have been described, the coil is wound directly around the magnetic core, a configuration in which a magnetic core is inserted in a bobbin and a coil is wound around the bobbin may be employed. In this case, the relative positions of the magnetic core and the coil are adjusted by moving the bobbin or the magnetic core.

Figure 7:
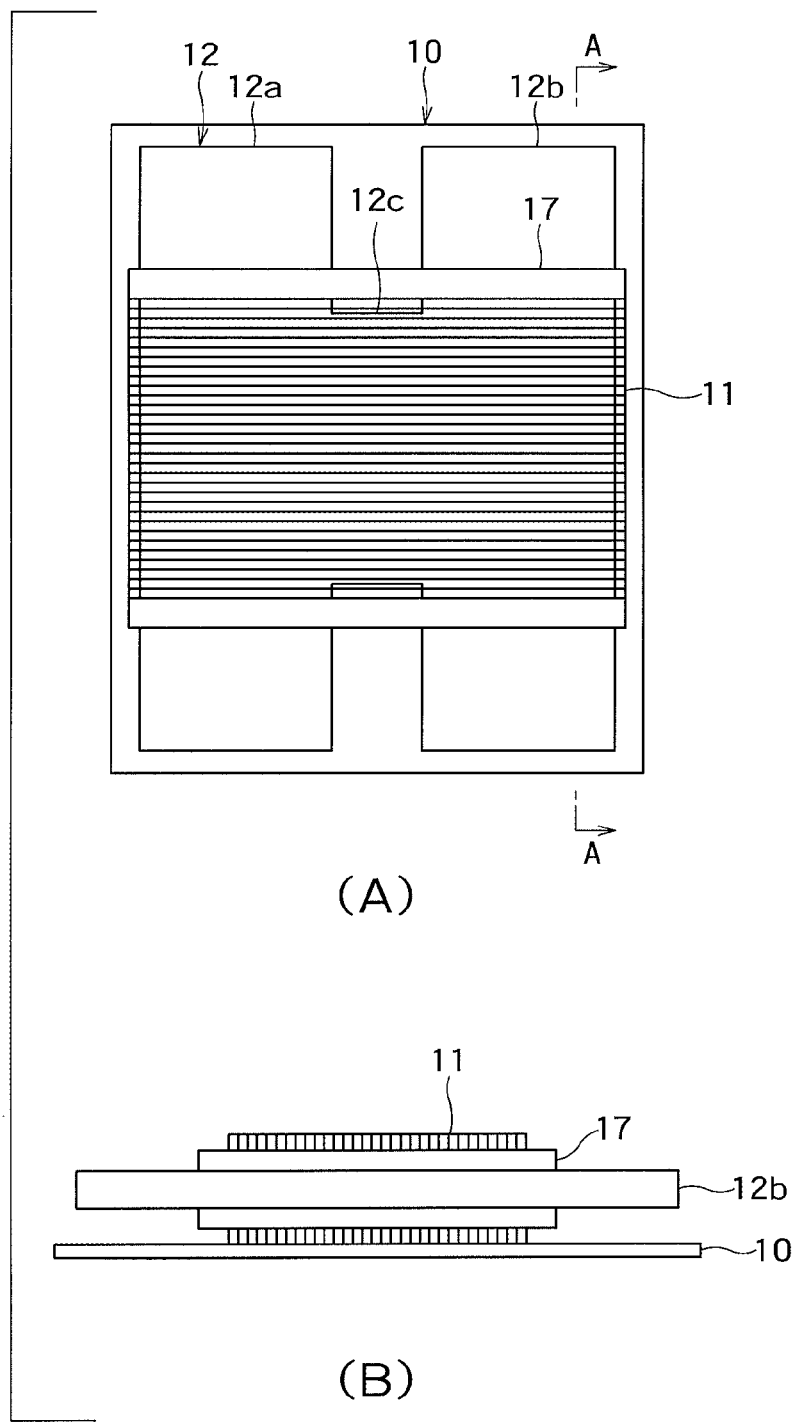
FIG. 7 shows an example of a resonator using a bobbin.

FIG. 7 shows an example of a resonator using a bobbin. FIG. 7(A) is a plan view, and FIG. 7(B) is a cross sectional view taken along a line A-A of FIG. 7(A). The magnetic core 12 (12*a*, 12*b*, and 12*c*) is the same as the H-shaped magnetic core shown in FIG. 5(A). The resonator includes the magnetic core 12, a bobbin 17, and a coil 11. The resonator is arranged on the conductive plate 10.

The magnetic core 12 is inserted into a hole of the tube-shaped bobbin 17. The bobbin 17 is made of, for example, a plastic. The coil 11 is wound around the bobbin 17. The bobbin 17 can be moved with respect to magnetic core 12 along a longitudinal direction of the coil, that is, along a longitudinal direction of the magnetic core 12. In such a manner, even in the case where a magnetic core is inserted into a bobbin, the relative positions of the magnetic core and the coil can be adjusted.

Second Embodiment

Figure 8:
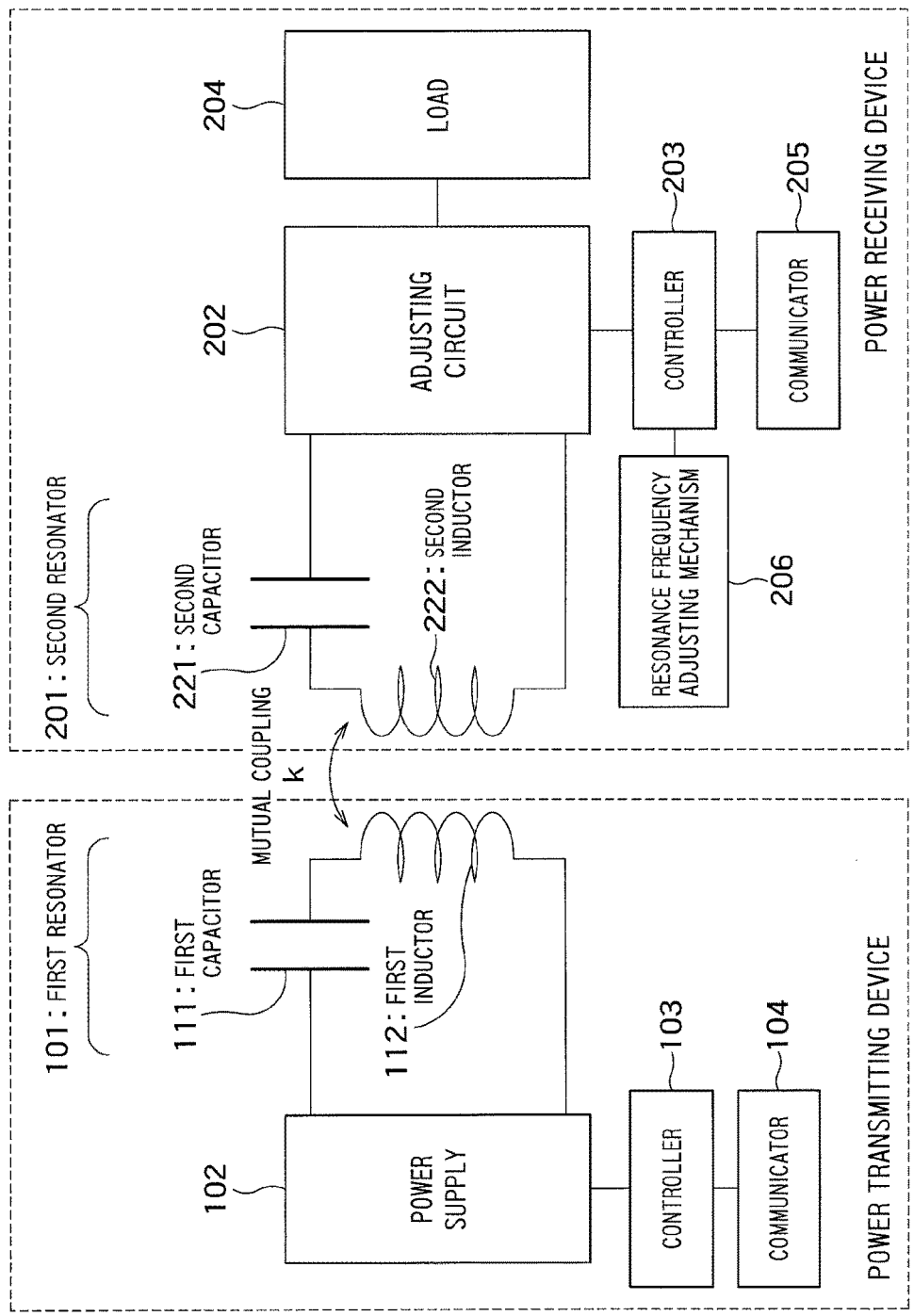
FIG. 8 shows a wireless power transmitting system according to a second embodiment including a power receiving device and a power transmitting device for transmitting power to the power receiving device.

FIG. 8 shows a wireless power transmitting system according to a second embodiment, including a power receiving device, and a power transmitting device for transmitting power to the power receiving device.

Although, in the first embodiment, the resonance frequency adjusting mechanism is provided in the power transmitting device, it is provided in the power receiving device, in the present embodiment.

In the state of receiving AC power from the power transmitting device, the second controller 203 adjusts the relative positions of the magnetic core and the coil in the second resonator 201 while monitoring a current value at an outputting terminal of the second resonator 201 (e.g., a terminal between the second capacitor 221 and the adjusting circuit 202). The adjustment of the relative positions is performed by controlling a resonance frequency adjusting mechanism 206. The positions of the magnetic core and the coil at the time when the current value becomes maximum (i.e., peaks) or becomes equal to or higher than a threshold value are identified. The magnetic core and the coil are positioned in these identified positions.

As described above, according to the present embodiment, by adjusting the relative positions of the magnetic core and the coil in the power receiving device, the deviation of a resonance frequency can be corrected, and transmission efficiency can be enhanced.

Third Embodiment

Figure 9:
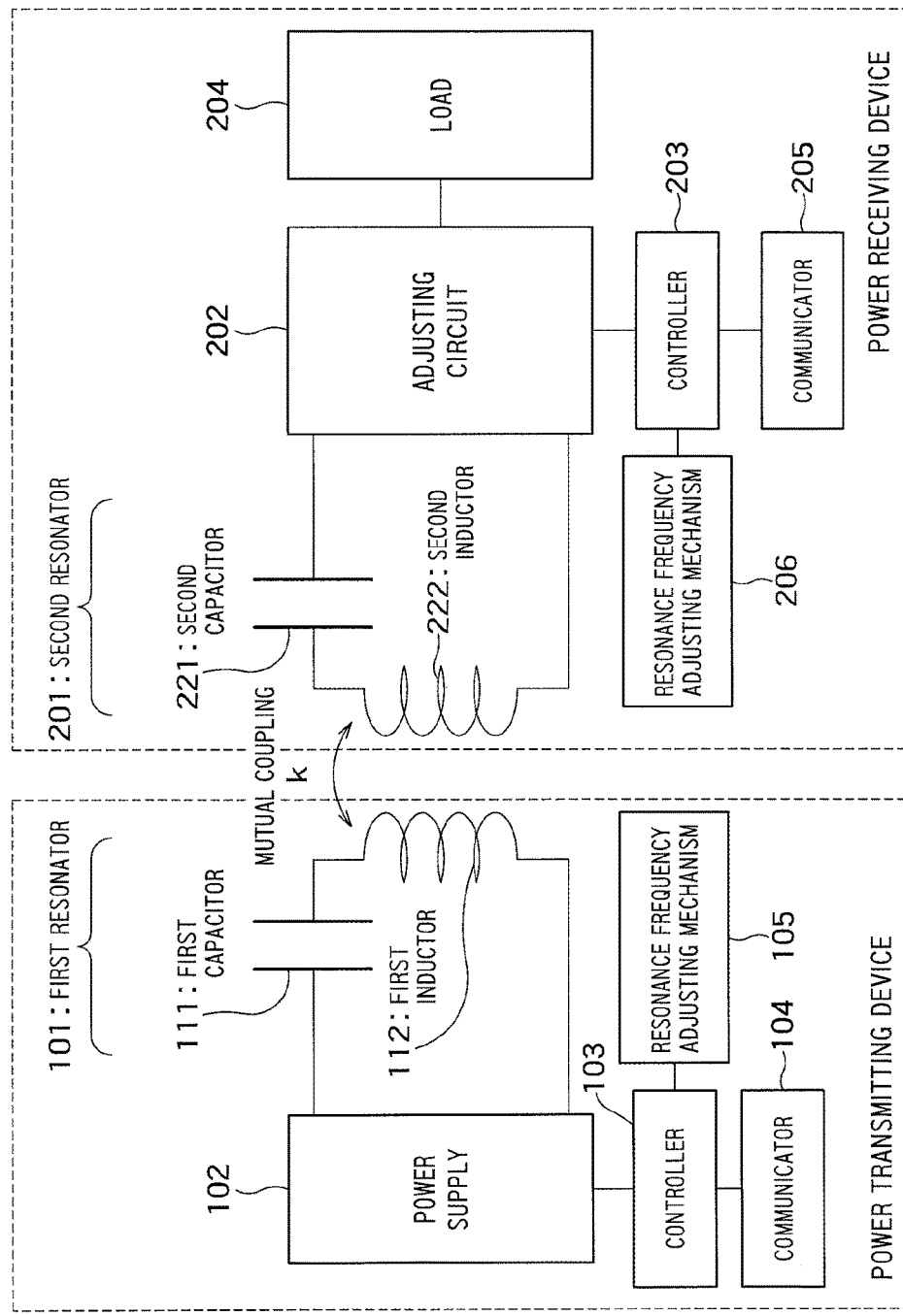
FIG. 9 shows a wireless power transmitting system according to a third embodiment.

FIG. 9 shows a wireless power transmitting system according to a third embodiment.

This wireless power transmitting system includes a power transmitting device and a power receiving device that include resonance frequency adjusting mechanisms 105 and 206, respectively.

The first controller 103 of the power transmitting device adjusts the relative positions of the magnetic core and the coil in the first resonator 101 while monitoring a current at an inputting terminal of the first resonator 101, as with the first embodiment. The adjustment of the relative positions is performed by controlling the resonance frequency adjusting mechanism 105. The positions at the time when the current value becomes maximum or becomes equal to or higher than a threshold value are identified, and the magnetic core and the coil are positioned in these identified positions.

The second controller 203 of the power receiving device adjusts the relative positions of the magnetic core and the coil in the second resonator 201 while monitoring a current at an outputting terminal of the second resonator 201, as with the second embodiment. The adjustment of the relative positions is performed by controlling the resonance frequency adjusting mechanism 206. The positions at the time when the current value becomes maximum or becomes equal to or higher than a threshold value are identified, and the magnetic core and the coil are positioned in these identified positions.

The positional adjustments in the power transmitting device and the power receiving device need to be performed in order. An example of a procedure for the positional adjustment will be described below.

First, in the case where a transmission frequency is not fixed, one of the power transmitting device and the power receiving device determines a value of a resonance frequency (transmission frequency) and an order of adjusting, and notifies the determined contents to the other. According to this order, the device in the first turn first performs resonance frequency adjustment. When the device in the first turn completes the resonance frequency adjustment, the device informs the completion to a device in the second turn, and the device in the second turn next performs the resonance frequency adjustment. The resonance frequency adjustment may be alternately repeated thereafter.

On the other hand, in the case where the transmission frequency is fixed, the power transmitting device and the power receiving device communicate with each other to determine an order of adjusting. The resonance frequency adjustment is performed once for each device according to the determined order. The resonance frequency adjustment may be alternately repeated thereafter.

As described above, according to the present embodiment, both of the power transmitting device and the power receiving device perform the adjustment, which can further enhance transmission efficiency. For example, even if the resonance frequency deviates due to the change in the positions of the resonators of the power transmitting device and the power receiving device, the deterioration of the power transmission efficiency can be suppressed by performing the relative position adjustment by both devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power transmitting device comprising:
a power supply to supply AC (Alternating Current) power;
a resonator including a magnetic core and a coil wound around the magnetic core, the resonator wirelessly transmitting the AC power supplied from the power supply to a different resonator arranged to be opposed to the resonator;
an adjuster to move magnetic core along a longitudinal direction of the coil; and
a controller to control the adjuster based on a value of current flowing in the resonator to adjust relative positions of the magnetic core and the coil,
wherein the magnetic core includes a plurality of magnetic blocks spaced apart from each other, and
the adjuster moves only a part of the magnetic blocks along the longitudinal direction of the coil.

2. The device according to claim 1, wherein the controller moves the magnetic core such that the value of current flowing in the resonator becomes maximum, or the value of current becomes equal to or higher than a threshold value.

3. The device according to claim 1, wherein a cross section of the magnetic core is changed along a longitudinal direction of the coil in a range within which the coil is able to move relative to the magnetic core.

4. The device according to claim 1, further comprising a tube-shaped bobbin, wherein
the magnetic core is arranged in a hole of the bobbin,
the coil is wound around the bobbin, and
the adjuster moves the bobbin and the magnetic core along the longitudinal direction of the coil.

* * * * *